April 6, 1954
F. FRANZ
2,674,514
ATTACHMENT FOR KYMOGRAPHS
Filed Dec. 16, 1948
2 Sheets—Sheet 2
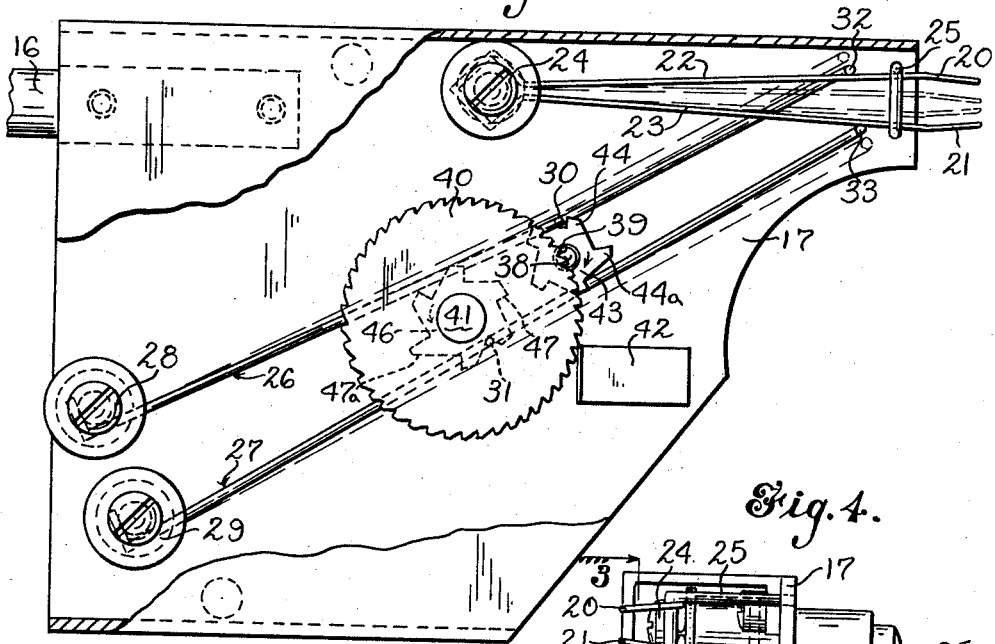
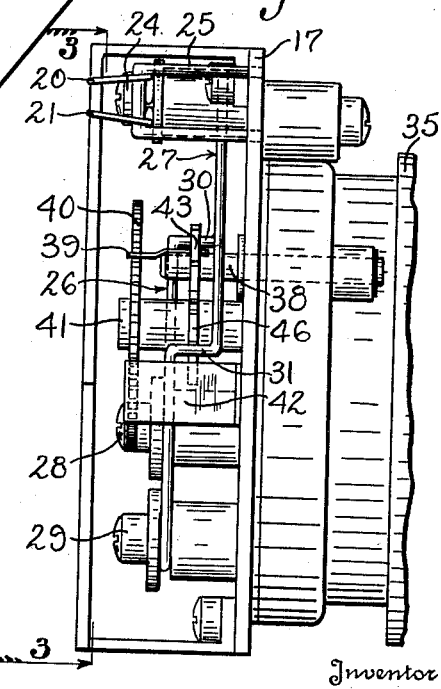
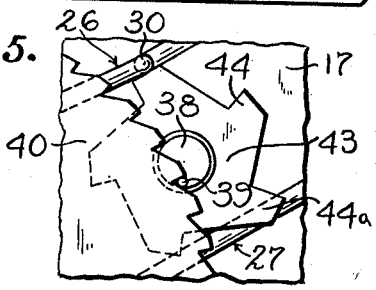
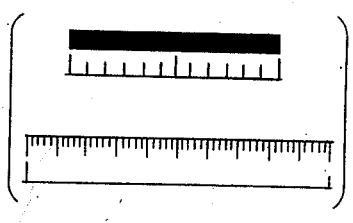
Inventor
Frederick Franz
By
Rockwell & Bartholow
ATTORNEYS Patented Apr. 6, 1954

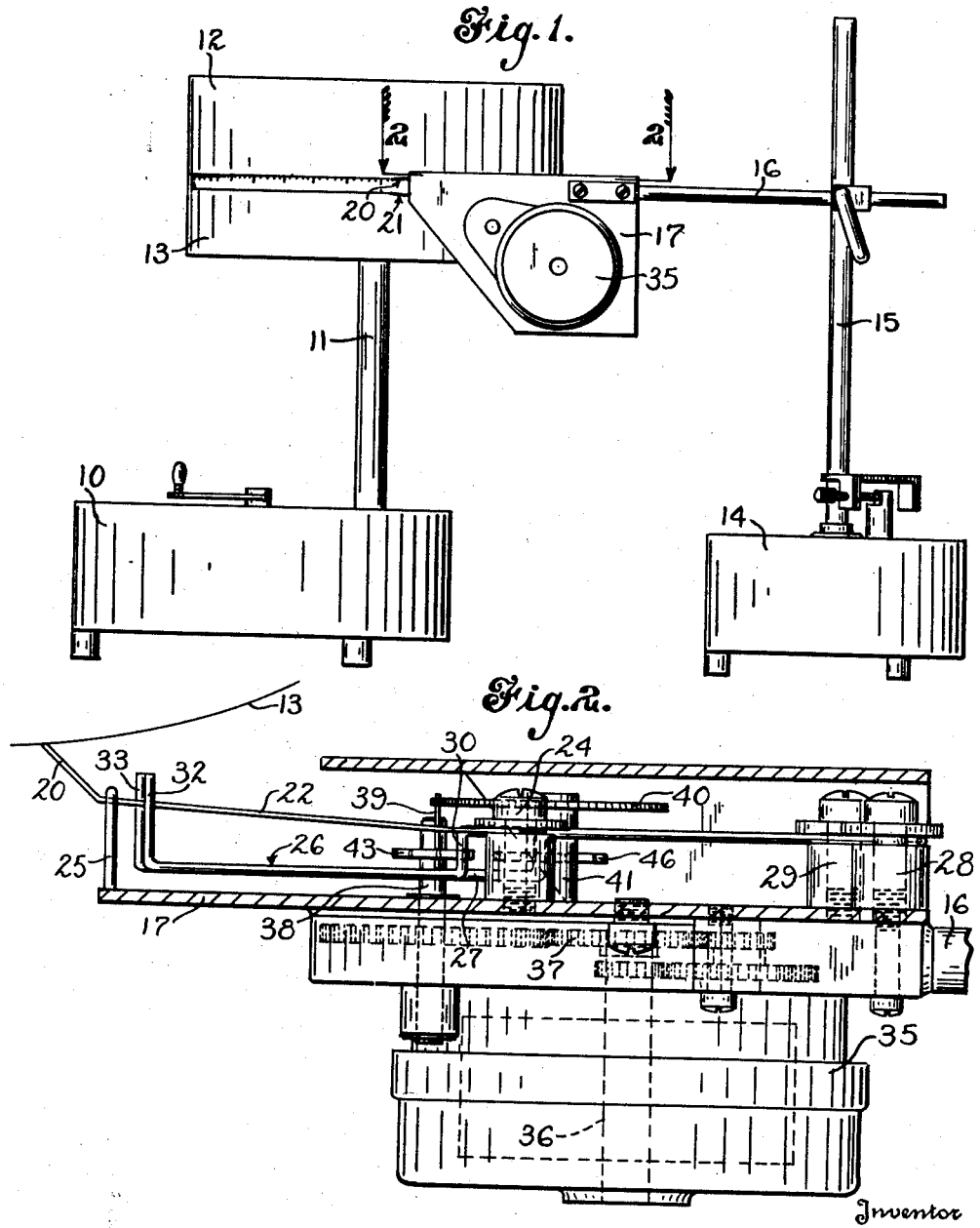

2,674,514

UNITED STATES PATENT OFFICE 2,674,514

ATTACHMENT FOR KYMOGRAPHS

Frederick Franz, New Haven, Conn.

Application December 16, 1948, Serial No. 65,601

11 Claims. (Cl. 346—49)

This invention relates to an attachment for kymographs or similar instruments and more particularly to a time-scale tracer for tracing a time scale upon a moving chart so that the factor of time may be related to other data recorded on the chart.

In the use of kymographs, a record is usually made on a chart, such as smoked paper, of pulse waves, respiratory movements and other biological responses, the smoked paper usually being mounted on a revolving drum. A time line or scale is generally traced upon the paper so that the observer may correlate the observed phenomena or the recorded data with absolute time. That is, as the paper is revolved by the drum upon which it is mounted, the time scale and a graph are traced at the same time, the graph representing the record of the responses which are desired to be observed.

I contemplate by the present invention the provision of a relatively simple and efficient device for tracing the time scale on a moving chart, illustrated in the present application as the chart on the revolving drum of a kymograph. To this end, I provide one or more styli (two as illustrated) which are carried by spring arms, and which are mounted to make contact with the chart and to be moved at intervals from a base line to trace marks at right angles to this base line, the intervals between these scale markings corresponding to definite intervals of time.

Each stylus is designed to be moved by an impact member, these impact members being in turn actuated from a synchronous electric motor, and the impacts against the stylus tending to move the same being made at regular time intervals. As illustrated, these impact members are carried by spring arms secured at their ends remote from the free ends which attack the styli, and cams or star wheels are provided to move the impact members in a direction away from the styli and then release them, whereby they may be returned toward their original positions by the inherent resilience of the spring arm, thus striking blows against the styli and moving them in the proper direction to trace scale marks upon the moving chart.

One object of the present invention is to provide a new and improved device for tracing time scale marks upon a moving chart.

Another object of the invention is to provide a simple and efficient mechanism for tracing time indications upon a moving chart, the mechanism comprising a stylus which is moved at regular and precise intervals of time in contact with the chart upon which the indications are to be traced.

Still another object of the invention is to provide an apparatus of the character described in which the movement imparted to the stylus at certain regular intervals of time is greater than that imparted to the stylus at other times, so that the scale traced upon the chart by the stylus will comprise both long and short scale markings, the longer scale markings denoting a greater interval of time than the shorter.

Still another object of the invention is to provide a device of the character described having one or more styli suitably supported to effect scale markings upon a chart, the styli being moved by impact members, which impact members are in turn actuated at regular intervals of time by means of a synchronous electric motor.

A still further object of the invention is to provide a device for tracing a plurality of scales on a moving chart, the indicating markings of certain of said scales being more numerous per unit of time than others of said scales.

A still further object of the invention is to provide a device for tracing time scales upon a moving chart, each of said scales having time intervals of a length different from those of the other scales so that phenomena of short duration may be as accurately timed as those of long duration.

To these and other ends the invention consists in the novel features and combinations of parts to be hereinafter described and claimed.

In the accompanying drawings:

Fig. 1 is a front elevational view of a kymograph showing the application of my improved attachment;

Fig. 2 is a sectional view of the time-scale-tracing attachment on line 2—2 of Fig. 1;

Fig. 3 is a sectional view on line 3—3 of Fig. 4;

Fig. 4 is a side elevational view of the attachment looking toward the right in Fig. 1;

Fig. 5 is a fragmentary view of one of the star-wheel cams and associated structure; and Fig. 6 shows the time scales traced upon the kymograph chart by my apparatus.

To illustrate a preferred embodiment of my invention, I have shown in the drawings in a conventional way a portion of a kymograph comprising a base 10 and an upright shaft 11 upon which is supported a revolving drum 12 carrying a chart 13 of smoked paper, as is usual in devices of this kind.

Adjacent this apparatus is a supporting base 14 carrying an upright rod 15 to which is adjustably secured an arm 16, this arm being rigidly secured to the frame or case 17 of the attachment for tracing the scale upon the chart 13. As shown more particularly in Fig. 3, the attachment comprises upper and lower styli 20 and 21, these styli being, as shown, formed integrally with spring arms 22 and 23 which are secured to the case or frame 17 by a screw or other suitable fastening member 24. The styli are provided upon the free ends of these spring arms, and are, due to the resilience of the arms, permitted movement in a direction substantially transverse to their length, or in an up-and-down direction, as shown in Fig. 3. Their movement away from each other may be limited by the staple 25 secured to the frame 17, the arms 22 and 23 passing between the legs of this staple.

Impact members, designated generally at 26 and 27, are provided to make contact with the spring arms 22 and 23 and move the latter. The impact members 26 and 27 are likewise of resilient material so as to constitute spring arms, and are secured to the frame 17 by the screws 28 and 29 at their ends remote from the styli. Intermediate their ends, the spring members 26 and 27 are provided with transversely extending portions 30 and 31 (Figs. 2 and 4) and, on their extended ends beyond these portions, are provided with transversely extended end portions 32 and 33 which lie across the spring arms 22 and 23 adjacent the styli 20 and 21. As shown in Fig. 3, these impact members lie on opposite sides of the styli, one lying above the upper stylus and the other below the lower stylus, so that the effective movement of these impact members to cause movement of the styli will be in a direction toward each other.

Secured to the frame 17 is the case 35 of a synchronous electric motor of any approved form, this motor having a shaft 36 which, through speed reducing gearing designated generally at 37, drives a shaft 38. Upon the end of the shaft 38 is eccentrically mounted a pin 39 (Figs. 2 and 5), this pin engaging the teeth of a ratchet wheel 40 secured to a shaft 41 rotatably mounted in the frame member 17. A stop pawl 42 may be provided to prevent reverse rotation of the ratchet wheel 40. While the shafts 38 and 41 may be rotated at any desired speed, I have found it convenient to rotate the shaft 38 at sixty revolutions per minute, and to rotate the shaft 41 at one revolution per minute. This reduction between the shafts can be readily and easily accomplished by the mechanism shown in Fig. 5 wherein sixty teeth are provided upon the ratchet wheel 40 and this wheel being moved through the angle subtended by one tooth by means of the pin 39 upon each revolution of the shaft 38. Thus, the shaft 38 will make one revolution per second and the shaft 41, one revolution per minute.

Mounted upon the shaft 38 is a cam in the form of a star wheel 43 having five salient points or projections 44, one of these projections, designated at 44ª, being longer than the rest. This cam rotates in a clockwise direction, as shown in Fig. 3, and its teeth are adapted to engage the transverse portion 30 of the spring arm 26 of the upper impact member, and thus raise the member from the spring arm 22 of the stylus 20. The projections 44 are provided at their trailing edges with a sharp drop toward the shaft 38 so that when the portion 30 of the impact member rides off of the projection, it will drop sharply downwardly toward the shaft 38, due to the resilience of the arm 26. Thus, the end 32 of the impact member will be raised from the stylus arm 22 and then descend sharply against the latter to strike it a sharp blow and cause it to move from the full-line position shown in Fig. 3 to the dotted-line position shown in that figure. Due to the fact that there are five of the salient points 44, each indication or scale mark made upon the chart by the stylus 20 due to these movements will represent one-fifth of a second, and every fifth scale mark will be longer than the preceding four, due to the greater length of the projection 44ª. Therefore, at every second a scale mark of greater length will be made upon the chart.

Upon the shaft 41 is secured a similar cam member in the form of a star wheel 46, this wheel being provided with salient points or projections 47. In this case, there are six such projections and one of them 47ª is of greater length than the remainder. These projections are adapted to engage the transverse portion 31 of the spring arm 27 of the lower impact member, and the star wheel rotating in a counterclockwise direction as viewed in Fig. 3, the member 27 will be moved downwardly or away from the spring arm 23 and then released so that it will be moved upwardly by its own resilience to strike the spring arm and move the stylus 21 upwardly to trace a scale marking upon the chart 13. As the shaft 41 makes one revolution per minute and has six projections, a scale marking will be made every ten seconds, and every sixth one of these markings (which will designate full minutes) will be longer than the rest, due to the greater length of the projection 47ª.

It may be noted that the direction of movement of the impact members at their point of contact with the styli is oblique to that of the styli themselves, and, by this disposition of the parts, there is a dissipation of energy by frictional contact between the two members so as to prevent the impact members from striking the styli a second rebound blow and thus prevent the tracing of fuzzy division lines between the interval scale marks. The impact members are light in weight and reach their maximum velocity before striking the styli. Their high velocity is then transmitted to the styli, thus insuring sharp graduations.

In Fig. 6 of the drawings, are shown the markings made upon the chart by the styli at two different speeds of revolution of the drum upon which the chart is mounted. The upper view of this figure corresponds to a very slow rotation of the drum, the length of the scale corresponding to two minutes of time. It will be seen from this view that the upper stylus makes a substantially continuous mark when the chart is revolved so slowly, and the lower stylus has made a scale marking every ten seconds, with longer marks denoting the one minute intervals. The lower view of this figure shows the scale markings when the drum is rotated rapidly, the length of the scales corresponding to ten seconds. In this instance, the upper stylus has made fifty scale markings, each of the shorter ones designating one-fifth of a second, and each of the longer ones designating the second intervals, while the lower stylus has recorded only the one ten-second interval. As seen the adjustment is such that the one minute and ten second division lines recorded by the lower stylus will align exactly with the one-second interval markings traced by the upper stylus.

While I have shown and described a preferred embodiment of my invention, it will be understood that it is not to be limited to all of the details shown but is capable of modification and variation within the spirit of the invention and within the scope of the claims.

What I claim is:

1. Means for tracing a scale on a moving sheet comprising a stylus, means for supporting said stylus in operative position with respect to the sheet, for movement in a direction parallel to the plane of the sheet, and for biasing it to stand in a predetermined position, an impact member biased to a position against said stylus, means to move said impact member repeatedly away from said stylus and then release it to effect repeated blows of the impact member on said stylus, and certain of said blows at regular intervals being heavier than the remaining blows.

2. Means for tracing a scale on a moving sheet comprising a stylus, means for supporting said stylus in operative position with respect to the sheet and biasing it to stand in a predetermined position, an impact member biased to a position against said stylus, means to move said impact member away from said stylus and then release it to effect repeated blows of the impact member on said stylus, said means comprising a rotatable cam member having a plurality of salient teeth to engage said impact member, and means for rotating said cam member, one of said teeth being longer than others of said member to effect a greater movement of the stylus.

3. Means for tracing a scale on a moving sheet comprising a stylus, means for supporting the stylus in operative position with respect to the sheet, an impact member adapted to strike said stylus, spring means urging said impact member toward the stylus, means to move said member away from the stylus and then release it, said means comprising a rotatable cam member having a plurality of projecting elements engaging the impact member, and means for rotating said member and the engaging surface on one of said elements lying at a greater distance from the axis of the cam member than that of the other elements to effect a greater movement of the stylus.

4. Means for tracing a scale on a moving sheet comprising a pair of styli, means for mounting said styli in operative position with respect to said sheet and for movement across the surface of the sheet substantially normal to the direction of the movement thereof, comprising spring arms upon one of which each stylus is mounted, an impact member engaging each stylus, means for moving said impact members to effect repeated blows thereof on said styli, said means comprising a cam member engaging each impact member, and a single motor for rotating said cam members.

5. Means for tracing a scale on a moving sheet comprising a pair of styli, means for mounting said styli in operative position with respect to said sheet comprising spring arms upon one of which each stylus is mounted, an impact member engaging each stylus, means for moving said impact members to effect repeated blows thereof on said styli, said means comprising a cam member engaging each impact member, and a single motor for rotating said cam members in timed relation one with another, one impact member being moved by its associated cam member in a direction opposite to that in which the other impact member is moved by the cam member associated therewith.

6. Means for tracing a scale on a moving sheet comprising a pair of styli, means for mounting said styli in operative position with respect to said sheet comprising spring arms upon one of which each stylus is mounted, an impact member engaging each stylus, means for moving said impact members to effect repeated blows thereof on said styli, said means comprising a cam member engaging each impact member, and means for rotating said cam members in timed relation one with another, one impact member being moved by its associated cam member in a direction opposite to that in which the other impact member is moved by the cam member associated therewith, each of said impact members being mounted on a spring arm whereby it is returned to its original position after being released by the associated cam member.

7. Means for tracing a scale on a moving sheet comprising a pair of styli, means for mounting said styli in operative position with respect to said sheet comprising spring arms upon one of which each stylus is mounted, an impact member engaging each stylus, means for moving said impact members to effect repeated blows thereof on said styli, said means comprising a cam member engaging each impact member, and means for rotating said cam members at such rotational speeds that the speed of one will be an even multiple of the speed of the other per unit of time, said cam members being positioned between said impact members and being rotated at different speeds.

8. Means for tracing a scale on a moving sheet comprising a stylus, means for supporting the stylus in operative position with respect to the sheet, an impact member adapted to strike said stylus, means to effect a succession of blows of said member against said stylus at regular intervals of time and means for effecting heavier blows at certain of said intervals than at others of said intervals.

9. Means for tracing a scale on a moving sheet comprising a stylus, a spring arm supporting said stylus in operative position with respect to the sheet for movement across the surface of the sheet, an impact member adapted to strike said stylus and means to move said impact member to effect a blow against said stylus arm, said spring arm biasing said stylus to normally stand in a predetermined position, and a second spring arm on which said impact member is mounted biasing said member to a position adjacent said stylus.

10. Means for tracing a scale on a moving sheet comprising a pair of styli, means for maintaining said styli in operative positions with respect to the sheet and for movement across the surface of the sheet substantially transverse to the direction of movement of sheet, said means comprising spring arms upon one of which each stylus is mounted, an impact member engaging each arm, and means for moving said impact members to effect repeated blows thereof on said styli, said means comprising a cam member engaging each impact member.

11. Means for tracing a scale on a moving sheet comprising a pair of styli, means for maintaining said styli in operative positions with respect to the sheet and for movement across the surface of the sheet substantially transverse to the direction of movement of the sheet, said means comprising spring arms upon one of which each stylus is mounted, an impact member engaging each arm, and means for moving said impact members to effect repeated blows thereof on said styli, and each of said impact members being mounted on a spring arm whereby it is returned to its original position after being moved to strike a blow on its associated stylus.

References Cited in the file of this patent

UNITED STATES PATENTS

| Number | Name | Date |
|---|---|---|
| 179,767 | Busha | July 11, 1876 |
| 493,346 | Wells | Mar. 14, 1893 |
| 1,690,517 | Wilson et al. | Nov. 6, 1928 |
| 1,779,619 | Potter | Oct. 28, 1930 |
| 2,019,902 | Geer et al. | Nov. 5, 1935 |
| 2,186,922 | Hampton et al. | Jan. 9, 1940 |
| 2,191,673 | Moore | Feb. 27, 1940 |
| 2,229,324 | Gordon | Jan. 21, 1941 |
| 2,287,819 | Nichols | June 30, 1942 |
| 2,410,755 | Smith | Nov. 5, 1946 |